United States Patent Office 2,761,806
Patented Sept. 4, 1956

2,761,806

METHOD OF CONTROLLING NEMATODES IN THE SOIL

William P. Boyer, Chesterfield County, Va., assignor to Virginia-Carolina Chemical Corporation, Richmond, Va., a corporation of Virginia No Drawing. Application October 27, 1954, Serial No. 465,120

9 Claims. (Cl. 167—30)

This application is a continuation-in-part of my applications Serial No. 327,027, filed December 19, 1952, and Serial No. 439,148, filed June 24, 1954.

In said application Serial No. 327,027 I disclosed compounds of the general formula

I

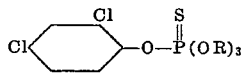

in which R is an alkyl group containing from 1 to 4 carbon atoms, and specifically the compounds (1) 2,4-dichlorophenyl dimethyl phosphorothioate
(2) 2,4-dichlorophenyl diethyl phosphorothioate
(3) 2,4-dichlorophenyl diisopropyl phosphorothioate
(4) 2,4-dichlorophenyl dibutyl phosphorothioate and disclosed that said compounds are useful as nematocides.

In said application Ser. No. 439,148 I disclosed the following additional compounds of said general formula:

(5) 2,4-dichlorophenyl di-n-propyl phosphorothioate
(6) 2,4-dichlorophenyl di-n-butyl phosphorothioate
(7) 2,4-dichlorophenyl di-iso-butyl phosphorothioate
(8) 2,4-dichlorophenyl di-sec-butyl phosphorothioate
(9) 2,4-dichlorophenyl di-tert-butyl phosphorothioate In the above lists of compounds number (4) is a generic name which embraces the specific compounds numbers (6), (7), (8) and (9) so that actually only eight specific compounds are disclosed in said two earlier applications.

Now I have found that other compounds within a broader genus which embraces the compounds disclosed in said applications Ser. Nos. 327,027 and 439,148 and compositions containing them are useful as nematocides.

The new compounds disclosed herein together with the compounds previously disclosed constitute a group which may be represented by the general formula

II

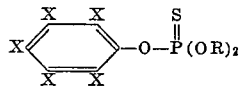

in which R is an alkyl group containing from 1–4 carbon atoms, from 1 to 4 of the five X's are members of the group consisting of hydrogen and chlorine, at least one X being chlorine and one X is a member of the group consisting of hydrogen and methyl. All of said compounds are useful nematocidal agents and are useful when applied alone or in combination wtih the vehicles, diluents, extenders, carriers etc. commonly used in the preparation of pesticidal compositions and hereinafter referred to generally as carriers.

My present invention therefore relates to nematocidal compositions containing the compounds of the above formula, to the use of such compositions for controlling nematodes and to certain of said compounds per se.

The discovery of the nematocidal properties of said compounds was not obvious from the prior art because there is no known correlation between the structure of a compound and its nematocidal properties or even between insecticidal and nematocidal properties. Nematodes are not insects and are not classed as insects and nematocides are not classed as insecticides as ruled by the U. S. Department of Agriculture. Nematocides are not subject to the regulatory laws of the U. S. Department of Agriculture for insecticides.

The compounds are prepared by reacting a dialkyl phosphorochloridothionate with a chlorophenol in the presence of a hydrogen chloride acceptor in a suitable solvent such as benzene, toluene and methyl ethyl ketone. Suitable hydrogen chloride acceptors are tertiary amines and sodium carbonate.

The reaction may be written as follows:

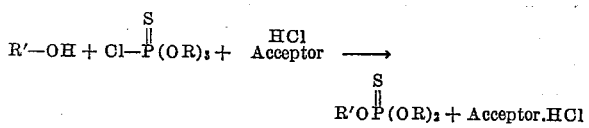

where R represents an alkyl group containing from 1 to 4 carbon atoms (methyl, ethyl, n-propyl, isopropyl, n-butyl, secondary butyl or tertiary butyl); and R' represents a chlorinated phenyl group which contains from 1 to 4 chlorine atoms and may contain a methyl group.

A specific process applicable for the preparation of all of said compounds is as follows.

A mixture of 1 mole of the dialkyl (methyl, ethyl, n-propyl, isopropyl, n-butyl, isobutyl, secondary butyl or tertiary butyl) phosphorochloridothionate, 1 mole of anhydrous sodium carbonate and 1 mole of 2,4-dichlorophenol and about 500 ml. of methyl ethyl ketone is refluxed for about 6 to 9 hours. The mixture is then cooled and filtered and the filtrate stripped of the methyl ethyl ketone by distillation under slightly reduced pressure. The residue of the distillation is dissolved in ethyl ether and the solution washed first with water and then with saturated sodium chloride solution and then dried over anhydrous sodium sulfate.

The ether is then removed under reduced pressure to produce technical products of sufficient purity for commercial use. The contents of the expected pure esters in these technical products have been found to vary from as low as 20% in the case of the dimethyl ester to more than 75% in the case of the other esters. It is expected that in large scale or plant operation the dimethyl ester content of the technical product may be brought up to at least about 75% and that the ester contents of the other technical products will all equal or exceed this figure. The technical products of the diethyl ester for instance have been found to contain more than 90% of the ester.

By fractionally distilling the technical products under reduced pressure the ester contents may be raised to above 90% and in some instances to analytical purity.

The relatively pure products obtained by fractional distillation are all colorless liquids while the technical products vary from light yellow to colorless and all of said products are somewhat soluble in many organic solvents but substantially insoluble in water.

Distillation fractions obtained by application of the above described procedure for the production of some of the named esters have the following properties.

(1) O-2,4-dichlorophenyl O,O-dimethyl phosphorothioate, B. P. 120–125° C. at 0.2 mm. mercury pressure, refractive index $n_D^{29°C.}=1.5478$, yield 20%.

(2) O-2,4-dichlorophenyl O,O-diethyl phosphorothioate, B. P. 126–131° C. at 0.15–0.25 mm. mercury pressure, refractive index $n_D^{25°C.}=1.5318$, yield, 77%.

(3) O-2,4-dichlorophenol O,O-diisopropyl phosphorothioate, B. P. 116–118° C. at 0.2 mm. mercury pressure, refractive index $n_D^{24°C.}=1.5179$, yield 75%.

(4) O-2,4-dichlorophenyl O,O-di-n-butyl phosphorothioate, B. P. 140–145° C. at 0.1 mm. mercury pressure, refractive index $n_D^{25°}$ C.=1.5161, yield 90%.

Table I illustrates representative specific compounds prepared by the above method with their chemical properties.

TABLE I

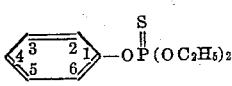

| Aryl Substituents | M. P. | B. P./mm. Hg | Ref. Index $n_D$ (t. °C.) | $d_4^{20°}$ | Yield, percent | Analytical Data | | Notes |
|---|---|---|---|---|---|---|---|---|
| | | | | | | Calcd. | Found | |
| 2-Cl | | 112-3.5/0.48 | 1.5205(31.5°) | 1.233 | 81 | P, 11.04<br>Cl, 12.63 | 11.10<br>12.83 | |
| 3-Cl | | 106.5-8/0.25 | 1.5166(31.5°) | 1.233 | 83 | P, 11.04<br>Cl, 12.63 | 11.05<br>12.95 | |
| 4-Cl | | 110-11.5/0.1 | 1.5219(20°) | 1.233 | 77 | P, 11.04<br>Cl, 12.63 | 11.08<br>12.81 | |
| 2,4-di-Cl | | 126-31/0.2 | 1.5318(25°) | 1.313 | 77 | C, 38.11<br>H, 4.16 | 38.09<br>3.91 | |
| 2,5-di-Cl | | 113.5-15/0.13 | 1.5300(27°) | 1.315 | 83.4 | P, 9.83<br>Cl, 22.50 | | |
| 2,4,5-tri-Cl | | 116-7/0.11 | 1.5424(26.5°) | 1.378 | 80.5 | P, 8.87 | 8.91 | (1) |
| 2,4,6-tri-Cl | 55.5-6.5 | 122-4/0.01 | | | 84.2 | P, 8.87<br>Cl, 30.42 | 8.69<br>30.33 | (2) |
| 2,3,4,6-tetra-Cl | | 153-5/0.6 | 1.5582(27°) | | 62.1 | P, 8.07<br>Cl, 36.93 | | |
| 4-Cl-2-Me | | 118/0.28 | 1.500(30°) | 1.210 | 22 | P, 10.51<br>Cl, 12.03 | 10.64<br>12.75 | |
| 4-Cl-3-Me | | 113-8/0.2 | 1.5211(25.5°) | 1.200 | 73 | P, 10.51<br>Cl, 12.03 | | |
| 2-Cl-6-Me | | 116-7.5/0.15 | 1.5215(29°) | 1.217 | 17.5 | P, 10.51<br>Cl, 12.03 | 10.66<br>12.23 | |

1 Butyl acetate was used as solvent. Preliminary washing was with 5% sodium carbonate instead of 5% sodium hydroxide. After stripping the butyl acetate, the product was dissolved in ether and washed with 5% and 2.5% sodium hydroxide.
2 Butyl acetate was used as solvent.

The esters are useful as nematocidal agents, being effective to control root knot nematodes when applied at the rate of about 280 pounds per acre. They have the unique property when used as nematocides that they have relatively low vapor pressures and their use need not therefore be accompanied by precautions such as injecting them into the soil or covering the ground with special paper to retain the vapors in the soil.

The nematocidal activity of the compounds decreases with increasing number of carbon atoms in the O,O-alkyl groups. Esters in which the O,O-alkyl groups contain more than 4 carbon atoms are not regarded at present as being sufficiently active to warrant commercial use.

The compounds may be applied to the soil as such e. g. by spraying but preferably are applied with a vehicle or extender. For example a quantity of any one of the compounds may be mixed with a suitable quantity of soil and the resulting mixture spread over the ground to give the desired rate of application. It would be difficult to spread the pure compounds over the ground at the rate as small as say 280 pounds per acre. Any other finely divided or granular solid material such as sand, saw dust or the like may be used instead of soil as the diluent or carrier for facilitating the uniform distribution of the compounds over the ground. Such mixtures of the esters with finely divided solid carriers may be distributed in any suitable manner as by drilling or broadcasting and then, if desired, mixed with the soil by plowing, harrowing, disking etc. A variety of known, finely divided solid carriers for materials such as insecticides are available for use as carriers for the esters such as for example the material described in U. S. Patent No. 2,547,730.

The esters may be applied also in liquid diluents or extenders in the same manner as other water insoluble materials such as DDT are applied e. g. in the form of an aqueous emulsion or dispersion of the esters themselves or solutions thereof.

The following are illustrative examples of the use of the esters.

*Example 1*

4 parts by weight of technical grade O-2,4-dichlorophenyl O,O-diethyl phosphorothioate were mixed with 1 part by weight of a commercial emulsifier known as Atlox G 2081 containing about 70% of a polyoxyethylene sorbitan mono-tall oil and about 30% of an alkyl aryl sulfonate. This mixture was applied (1) as a drench by means of a garden hose and nozzle by aspirating it into the stream of water discharged from the nozzle and (2) by injecting it into the soil by means of a drill. When applied as a drench to Bermuda grass turf to control stubby root nematode at the rate of 2 mls. of the technical ester per square foot, two months after application the turf was in excellent condition, the root growth being heavy and normal. Check plots both untreated and treated with other proprietary nematocides such as (a) a 50–50 mixture of dichloropropene and dichloropropane and (b) an 85% dispersion of ethylene dibromide varied from no growth to fair growth.

The proprietary nematocides were applied by injecting them into the turf at a depth of 3 to 6 inches, one injection to each square foot. Nematocide (a) was injected at the rate of 12 cc. per square foot and (b) at the rate of 0.5 cc. per square foot. It is to be noted that application of the proprietary nematocides by injection is laborious and costly as compared to drenching by means of a sprinkling nozzle which may be done as a part of the regular watering of the turf.

When applied as a drench to corn, squash and bean crops at the rate of 2 mls. of the technical grade diethyl ester per square foot followed by cultivation, three months after application the corn plants were 5 to 6 feet high, with normal root systems whereas check plants, both untreated and treated with the proprietary nematocides (a) and (b) referred to above were greatly stunted, being 2–3 feet high, and their root systems were highly abnormal.

In this test the proprietary nematocides were injected by means of a drill following the plow (a) at the rate of 20 gallons per acre and (b) at the rate of 4.5 gallons per acre respectively.

The squash and bean plants treated in accordance with the present invention also were normal whereas the check plants were greatly stunted.

When applied as a drench in the furrow 16 days before tobacco seedlings were planted at the rate of .067 gallon of the technical grade of the diethyl ester in 48 gallons of water to a 32 foot furrow excellent root-knot control was obtained.

*Example 2*

1 part by volume of technical grade O-2,4-dichlorophenyl O,O-diethyl phosphorothioate was sprayed onto and mixed with 90 parts by volume of heat-expanded vermiculite and the mixture was distributed onto and into the soil of a celery bed by cultivation at the rate of 2 mls of the technical ester per square foot of soil. After 60 days the average root knot infestation of the celery was 1.25% as compared to 3.0% in a check plot which had been treated with proprietary nematocide (a) referred to above.

The other alkyl esters gave similar results but as stated above the methyl ester is more active i. e. effective in smaller amounts and the propyl and butyl esters less effective than the ethyl ester. In spite of its lower activity as compared to the methyl ester, the ethyl ester is preferred from the standpoint of cost.

The test results shown in Table II below illustrate the nematocidal action of representative members of the products listed in Table I. The general method of greenhouse evaluation is as follows.

Compounds to be evaluated were mixed with an emulsifying agent and water to form an approximate 0.25% solution. The treatment dosage basis employed ranged from 250 lbs./acre to 85 lbs./acre. The predetermined amount of the 0.25% solution was mixed with enough soil, infested with root knot nematodes, to fill three 4″ pots.

The pots were placed in sand in the greenhouse benches and the treated soil received the normal greenhouse watering for a period of two weeks. At this time tomato seedlings, three to five inches tall, were transplanted into the pots, one per pot.

After allowing the plants to grow for approximately 35 days, observations of the roots were made to detect any root knot infestation. Roots were examined in the following manner:

Typical sections of the roots from all three plants of each test were cut off and weighed out to a total of 2 grams. These two grams of roots were closely examined, under microscope if necessary, and the individual root knots were counted. The following code for root knot control was used and is illustrated for the reports of Table II.

0—no root knots
1—1 to 10 knots/2 g. roots
2—11 to 20 knots/2 g. roots
3—21 to 30 knots/2 g. roots
4—above 30 knots/2 g. roots

TABLE II

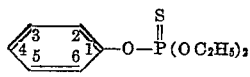

| Aryl Substituents | Root Knot Infestation |
|---|---|
| 2-Cl | 3 |
| 3-Cl | 1 |
| 4-Cl | 1 |
| 2,4-di-Cl | 0 |
| 2,4,5-tri-Cl | 0 |
| 2,4,6-tri-Cl | 0 |
| 4-Cl-2-Me | 3 |

A compound which has a rating of 0 is an excellent nematocide. A rating of 4 is equal to the untreated checks and illustrates very little or no nematocidal action. A rating of 3 indicates definite nematocidal action but possibly too little action to warrant commercialization of the product in question.

Because of the difficulty of quantitative biological evaluations of this type I do not wish to be held to the relative order of activity of the compounds illustrated. The factors of soil types, soil moisture, temperature and a host of others all have an effect on the nematocidal action of a compound under test. Therefore, different investigators may rate a single compound by different scale numbers.

I claim:
1. The method of controlling nematodes in the soil which comprises applying thereto a compound of the general formula

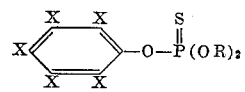

in which R is an alkyl group containing from 1 to 4 carbon atoms, at least one X and not more than four X's are chlorine and one X is a member of the group consisting of hydrogen and the methyl group.

2. The method as defined in claim 1 in which said compound is O-2,4-dichlorophenyl O,O-diethyl phosphorothioate.

3. The method as defined in claim 1 in which the compound is O-2,4,6-trichlorophenyl O,O-diethyl phosphorothioate.

4. The method as defined in claim 1 in which the compound is O-2,4,5-trichlorophenyl O,O-diethyl phosphorothioate.

5. The method as defined in claim 1 in which the compound is O-3-chlorophenyl O,O-diethyl phosphorothioate.

6. The method as defined in claim 1 in which the compound is O-4-chlorophenyl O,O-diethyl phosphorothioate.

7. Method of controlling nematodes in the soil which comprises applying an aqueous emulsion of a O,O-dialkyl ester of O-2,4-dichlorophenyl phosphorothioate in which the alkyl groups contain from 1 to 4 carbon atoms.

8. Method of controlling nematodes in the soil which comprises mixing a O,O-dialkyl ester of O-2,4-dichlorophenyl phosphorothioate in which the alkyl groups contain from 1 to 4 carbon atoms with a finely divided solid material and mixing the resulting mixture with the soil.

9. The method of controlling nematodes in the soil which comprises applying thereto a composition consisting essentially of a O,O-dialkyl ester of O-2,4-dichlorophenyl phosphorothioate in which the alkyl groups each contain from 1 to 4 carbon atoms.

References Cited in the file of this patent

UNITED STATES PATENTS

| | | |
|---|---|---|
| 2,599,512 | Drake et al. | June 3, 1952 |
| 2,599,516 | Moyle | June 3, 1952 |
| 2,692,891 | Young et al. | Oct. 26, 1954 |